Oct. 27, 1970  T. E. HOLT ETAL  3,536,523
DRYING OF BITUMEN EMULSION
Filed May 13, 1968
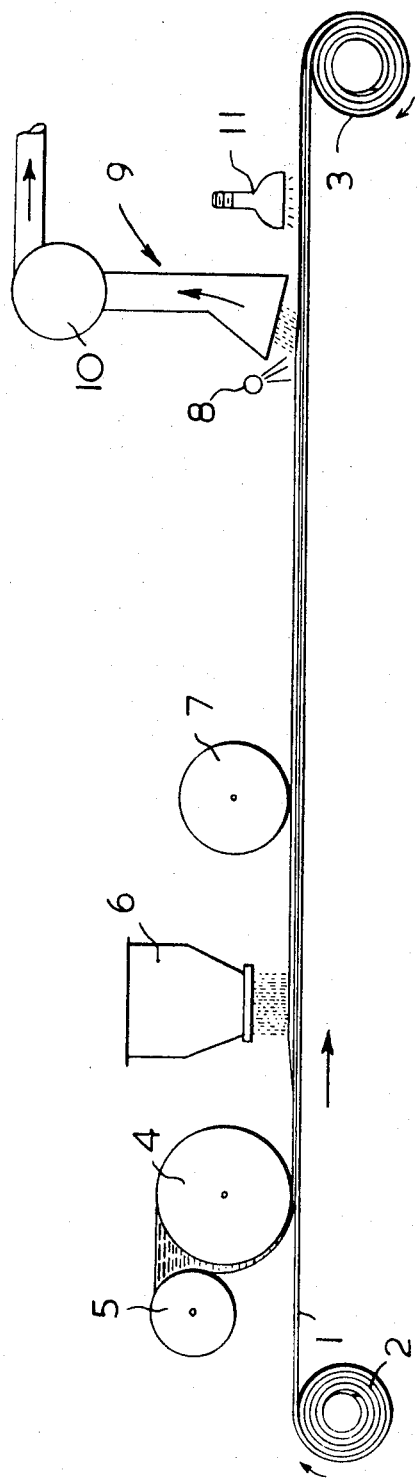

United States Patent Office 3,536,523
Patented Oct. 27, 1970

---

3,536,523
DRYING OF BITUMEN EMULSION
Thomas Eric Holt, Hudson, Quebec, and Emilien Beaudet, La Salle, Quebec, Canada, assignors to Building Products of Canada Limited, Montreal, Quebec, Canada
Filed May 13, 1968, Ser. No. 728,527
Int. Cl. B01d *43/00;* B44d *1/44;* D06n *5/00*
U.S. Cl. 117—119.6                             12 Claims

ABSTRACT OF THE DISCLOSURE

A method of drying of aqueous bitumen emulsions such as asphalt emulsions and coal tar pitch emulsions and particularly applicable to the drying of such emulsions in the production of weather resistant roofing cap sheeting. The aqueous bitumen emulsion is applied to a saturated or saturated and coated felt and a finely divided water wettable and water absorbent particulate material is applied to the surface to dry the emulsion layer. The wetted water absorbent particulate material is then removed from the surface and may be subsequently dried and recycled for further use.

---

The present invention relates to the drying of aqueous bitumen emulsions such as asphalt emulsions and coal tar pitch emulsions and in particular relates to the drying of such emulsions in the production of weather resistant roofing cap sheeting.

At the present time built up roofing is applied to a building in situ by laying upon the roof of the building two or more layers, normally in lapping relationship, of either asphalt saturated felt or asphalt saturated and coated felt which layers are bonded together in situ with either a hot melt asphalt or a cut back asphalt. To provide an exposed weathering surface for said roof either a hot melt asphalt covered with gravel or an aqueous asphalt emulsion is applied to the upper surface of the layers the hot melt asphalt being allowed to harden and the aqueous asphalt emulsion being allowed to dry. Of the two weathering surfaces the dried aqueous asphalt emulsion has been found to have exceptional weathering qualities and is thus preferred to the hardened hot melt asphalt. However, in cold climates in the winter months it is impossible to use an aqueous asphalt emulsion to provide the weathering surface as the aqueous asphalt emulsion freezes before it is able to dry with the result that the emulsion breaks down and the exposed weathering surface is inferior. It has therefore been necessary during winter months in countries having cold climates, such as Canada, to use a hot melt asphalt to provide the exposed weathering surface in preference to the aqueous asphalt emulsion even allowing for the inferior weathering properties of the surface.

Again even in warm climate countries the aqueous asphalt emulsion is manually applied to the layers forming the built-up roofing and there is always the problem of obtaining consistent quality control in the weathering properties of the roofing due to the nonuniformity of the applied aqueous asphalt emulsion layer.

To overcome the aforesaid disadvantages applicants have attempted to prepare a preformed weather resistant roofing cap sheet formed from an asphalt saturated felt sheet by applying the aqueous asphalt emulsion to the sheet under controlled conditions in a factory whereby the preformed sheet may be applied directly to the roof by conventional methods and thus eliminate the necessity of subsequently applying the aqueous asphalt emulsion coating as this is already present on the surface of the preformed sheet. By this means it is possible to prepare roofs having a dried asphalt emulsion coating as the weathering surface at any period of the year no matter what the weather and at the same time the asphaltic emulsion coating is uniform and therefore quality control is assured. A major problem encountered during the preparation of this preformed sheet is the drying of the asphaltic emulsion in the factory as heretofore when the asphalt emulsion is applied in situ on the roof it is left to air dry at ambient temperatures and thus the emulsion coating retains the structure of the emulsion, i.e., under microscopic examination the dried asphaltic emulsion layer is highly particulate, which is necessary to obtain the aforesaid desirable weathering properties. However, under factory conditions and at normal economic factory production rates by conventional means air drying of the asphaltic emulsion coating at ambient temperature is not feasible due to the excessive time taken for such drying and further using heat to dry the emulsion coating has two basic disadvantages namely the energy required to satisfy the specific and latent heat requirements of the water in the asphaltic emulsion and further drying at any temperature substantially in excess of the softening point of the asphalt in the emulsion produces a film, i.e., destroys the structure of the emulsion and thus destroys the excellent weathering properties of the asphalt emulsion layer. Therefore, even with heating relatively low temperatures have to be used and the use of such relatively low temperatures does not sufficiently reduce the time of drying the aqueous asphalt emulsion in the factory to make the production of the preformed weathering sheets economical.

The present invention provides a method of drying the asphaltic emulsions in a relatively short period of time and desirably the drying time is extremely short which renders the production of such weather resistant roofing cap sheet highly economical.

It has now been found according to the present invention that it is possible to quickly dry an aqueous bitumen emulsion coating without the necessity of application of heat by applying to the coating a finely divided water wettable particulate material which upon application to the emulsion coating is not absorbed into the emulsion coating the particulate material having a particle size less than the size of the particles of the bitumen in the emulsion layer whereby the particulate material absorbs the water preferentially over the bitumen particles in the emulsion coating to dry emulsion coating.

According to the present invention therefore there is provided a method of drying an aqueous bitumen emulsion which comprises applying to said emulsion a water wettable particulate material having a particle size less than the size of the bitumen particles in said emulsion and subsequently removing said wetted particulate material from said emulsion. The wetted particulate material may be subsequently dried and recycled for further use.

As aforesaid the drying of the emulsion has particular application to the preparation of a weather resistant roofing cap sheet and thus the present invention also provides a method of making a weather resistant roofing cap sheet which comprises applying to a surface of an asphalt saturated felt sheet a layer of an aqueous bitumen emulsion, applying to said emulsion layer a finely divided water than the size of the bitumen particles in the emulsion whereby to dry said emulsion layer and subsequently removing the wetted particulate material from said dried emulsion layer. The wetted particulate material may be subsequently dried and recycled for further use.

The aqueous bitumen emulsion is suitably an aqueous asphalt or coal tar pitch emulsion and as normally aqueous asphalt emulsions are used in the formation of the exposed weathering surface of the built up roofing preferably the bitumen emulsion is an aqueous asphalt emulsion. The aqueous asphaltic emulsion is a conventional asphaltic emulsion heretofore used in providing the weathering surface of conventional built up roofing and to avoid the drying powder being absorbed into the emulsion should have a solids content of at least 20% and more preferably at least approximately 50%. The asphaltic emulsion may be clay stabilized, e.g., include up to about 3% of a bentonite type of clay and up to 1% of an anionic type of emulsifying agent such as a soap. Further the asbestos fibres may be incorporated in order to minimize cold flow on the roof. The particle size of the asphalt in the emulsion is usually in the range 2–4 microns and thus the particle size of the particulate material should be less than this particle size and at the same time the partiulate material must be water wettable capable of absorbing water and not absorbable into the emulsion. Particular materials which may be mentioned are natural and synthetic silicates, such as those supplied under the trademarks Celkate (a synthetic magnesium silicate) and Micro-Cell (a synthetic calcium silicate) by Johns-Manville, which are described in Handbook of Material Trade Names, published by Industrial Research Service Corporation, Dover, N.H., 1956, Supplement No. 1, and preferably fly ash which is a byproduct obtained from thermal power stations and therefore is an extremely economic material as it costs virtually nothing the thermal power stations being glad to dispose of it. When fly ash is used the wetted fly ash removed from the aqueous emulsion may be disposed of due to its cheapness but, of course, if desired the wetted fly ash or the synthetic silicate material may be dried conventionally by means of heat and subsequently recycled for reuse in the process. These particulate materials have a particle size of less than 0.1 micron and this means that the available surface of the particulate material is many times larger than that of the particles of the asphalt in the emulsion and thus the effect of applying the particulate material to the surface of the emulsion is to cause a redistribution of the water in emulsion between the available surfaces of the asphalt particles in the emulsion and the particulate material. As the latter is much larger than the former the bulk of the water is rapidly transferred from the emulsion to the available surface of the particulate material. Other particulate materials which may be used include materials which in addition may form stable hydrates with the water such as plastic of paris and magnesium sulfate. With these materials initial absorption of the water from the emulsion is due to particle size and the absorbed water will then form a stable hydrate.

The felt forming the substrate of the weathering sheet is suitably a conventional asphalt saturated felt which may have on one or both sides thereof a filled asphalt coating the asphalt emulsion being suitably applied to one side of the felt. The felt is a nonwoven sheet suitably formed from organic or inorganic fibres and from an economic point of view is usually formed from waste material such as fibrous cellulosic material.

The present invention will be further illustrated by way of the accompanying drawing which is a schematic representation of the process according to a preferred embodiment of the present invention. Referring to the drawing an asphalt saturated and coated felt 1 is withdrawn from an unwind roller 2 and is taken up on a wind-up roll 3. During its passage from the unwind roller 2 to the wind-up roller 3 it passes beneath a coating station in which an aqueous asphalt emulsion is applied to the upper surface thereof by an applicator roll 4, the thickness of the layer of emulsion applied to the felt being controlled by a meter roll 5.

Down stream of the coating station a finely divided particulate drying material is applied to the surface of the emulsion by means of a vibrating screen 6 or other suitable means the size of the particles in the drying material being substantially less than the size of the asphalt particles in the emulsion. A light pressure roll 7 applied a light pressure to the emulsion coating in order to promote initial contact of the particulate material with the water in the emulsion thereby enhancing the absorption of the water by the particulate material. It is found that the water in the emulsion is quickly extracted by the particulate material and the drying material plus the absorbed water are removed by means of an air jet 8 and a vacuum exhaust system 9 including a vacuum fan 10. Depending upon the efficiency of the drying, if desired the emulsion can be passed through a further similar drying system although generally at most a very short conventional drier 11 is required to complete the drying, although in most cases this drier is not required. The resulting weather resistance roofing cap sheet is taken up on the wind-up roll 3 and contains the dried asphalt emulsion in a condition similar to that obtained by ambient temperature air drying which occurs when the emulsion is applied in situ on a roof. Thus, microscopic examination of the dried asphalt emulsion film shows the asphalt film to be high particulate and not in the form of a solid film as would be obtained from a hot melt.

The present invention will be further illustrated by way of the following examples:

EXAMPLE 1

Using the method set forth in the accompanying drawing a coating of an aqueous asphaltic emulsion having a solids content of approximately 50% was applied at a rate of 0.8 gallon per hundred square foot of an asphalt saturated and coated felt by means of applicator roll 4 and meter roll 5 and Johns-Manville's Micro-Cell powder type E was sprinkled onto the wet emulsion surface at the rate of 1.3 pounds per hundred square foot by means of the vibrating screen 6 and the powder was lightly rolled onto the emulsion by means of the pressure roll 7. Subsequent removal of the powder by means of the air jet 8 and the vacuum exhaust system 9 produced a weather resistant roofing cap sheet having a dried asphalt emulsion coating of approximately 0.010 inch thickness which on oven drying showed that 91% of the water in the emulsion had been removed by means of the powder.

EXAMPLE 2

Using the apparatus of the accompanying drawings a coating of an aqueous asphalt emulsion a solids content of approximately 50% was applied to an asphalt saturated and coated felt at a rate of 1.6 gallons per hundred square foot by means of the applicator roll 4 and meter roll 5. Micro-Cell powder type E was sprinkled over the surface of the wet emulsion from the vibrating screen 6 at a rate of 2.8 pounds per hundred square foot and the powder was lightly rolled onto the emulsion by means of the pressure roll 7. Subsequently, the wet powder was removed by means of the air jet 8 and the vacuum exhaust system 9, the weather resistant roofing cap sheet had a dried asphalt emulsion layer of approximately 0.020 inch and which oven drying showed that 95% of the water had been removed by means of the powder.

EXAMPLE 3

A coating of an aqueous asphalt emulsion of solids content of approximately 50% was applied at a rate of 2 gallons per hundred square foot by means of the applicator roll 4 and meter roll 5 to an asphalt saturated uncoated felt. Fly ash was sprinkled over the surface of the wet emulsion by means of the vibrating screen 6 at a rate of 30.8 pounds per hundred square foot and the powder was lightly rolled onto the emulsion by means of the pressure roll 7. Subsequently, the fly ash was removed by means of the air jet 8 and the vacuum exhaust system 9 to yield a weather resistant roofing cap sheet having a dried aqueous emulsion layer of 0.020 inch. Oven drying of this sheet showed that 90.6% of the water had been removed by means of powder.

We claim:

1. A method of drying an aqueous bitumen emulsion which comprises applying thereto a water wettable and water absorbent particulate material having a particle size less than the size of the bitumen particles in said emulsion and subsequently removing the wetted particulate material from the dried emulsion surface.

2. A method of making a weather resistant roofing cap sheet which comprises applying to a surface of an asphalt saturated felt sheet a layer of an aqueous bitumen emulsion, applying to said emulsion layer a finely divided water wettable and water absorbent particulate material having a particle size less than the size of the bitumen particles in the emulsion to dry said emulsion layer and subsequently removing the wetted particulate material from the dried emulsion layer.

3. A method as claimed in claim 2 in which the aqueous bitumen emulsion is applied to an asphalt coated and saturated felt sheet.

4. A method as claimed in claim 3 in which the asphalt coating is filled.

5. A method as claimed in claim 3 in which the asphalt coat is on both sides of the felt sheet.

6. A method as claimed in claim 1, in which the aqueous bitumen emulsion is an asphalt or coal tar pitch emulsion.

7. A method as claimed in claim 1 in which the aqueous bitumen emulsion is an asphalt emulsion.

8. A method as claimed in claim 1 in which the emulsion contains at least 20% solids.

9. A method as claimed in claim 1 in which the emulsion contains at least 50% solids.

10. A method as claimed in claim 1 in which the emulsion has a bitumen particle size in the range 2 to 4 microns and the particulate material has an ultimate particle size of less than 2 microns.

11. A method as claimed in claim 1 in which the particulate material is fly ash or a natural or synthetic silicate.

12. A method as claimed in claim 1 in which the wetted particulate material removed from the emulsion is subsequently dried and recycled for further use.

References Cited

UNITED STATES PATENTS

| | | | |
|---|---|---|---|
| 1,263,051 | 4/1918 | Ford | 117—120 X |
| 1,967,856 | 7/1934 | Beckman. | |
| 2,493,381 | 1/1950 | Balassa | 117—102 |
| 2,541,631 | 2/1951 | Baskin | 117—92 X |
| 2,636,834 | 4/1953 | Myers | 117—102 X |
| 3,039,495 | 6/1962 | Drukker | 117—92 X |
| 3,151,951 | 10/1964 | Reid et al. | 34—9 |
| 3,276,906 | 10/1966 | Nielsen | 117—92 X |

ALFRED L. LEAVITT, Primary Examiner

T. E. BOKAN, Assistant Examiner

U.S. Cl. X.R.

34—9; 117—68, 92, 102, 140